United States Patent
Clark et al.

(10) Patent No.: US 8,397,133 B2
(45) Date of Patent: Mar. 12, 2013

(54) CIRCUITS AND METHODS FOR DUAL REDUNDANT REGISTER FILES WITH ERROR DETECTION AND CORRECTION MECHANISMS

(75) Inventors: Lawrence T. Clark, Phoenix, AZ (US); Dan W. Patterson, Scottsdale, AZ (US); Xiaoyin Yao, Albuquerque, NM (US); David Pettit, Gilbert, AZ (US); Rahul Shringarpure, Calabasas, CA (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 455 days.

(21) Appl. No.: 12/626,488

(22) Filed: Nov. 25, 2009

(65) Prior Publication Data

US 2010/0269022 A1 Oct. 21, 2010

Related U.S. Application Data

(60) Provisional application No. 61/118,364, filed on Nov. 26, 2008, provisional application No. 61/118,360, filed on Nov. 26, 2008, provisional application No. 61/118,337, filed on Nov. 26, 2008, provisional application No. 61/118,351, filed on Nov. 26, 2008.

(51) Int. Cl.
*G06F 11/00* (2006.01)
(52) U.S. Cl. ...................................................... 714/766
(58) Field of Classification Search .......... 714/763–766, 714/758
See application file for complete search history.

(56) References Cited

U.S. PATENT DOCUMENTS

| | | | |
|---|---|---|---|
| 5,347,648 A | 9/1994 | Stamm et al. | |
| 5,870,341 A * | 2/1999 | Lin et al. | 365/200 |
| 5,983,370 A | 11/1999 | Anderson | |
| 6,381,622 B1 | 4/2002 | Lie | |
| 6,701,484 B1 * | 3/2004 | Jordan et al. | 714/801 |
| 6,838,899 B2 * | 1/2005 | Plants | 326/9 |
| 6,901,532 B2 | 5/2005 | DeRuiter et al. | |
| 6,901,540 B1 | 5/2005 | Griffith, Jr. et al. | |
| 6,990,010 B1 * | 1/2006 | Plants | 365/189.15 |
| 7,036,059 B1 * | 4/2006 | Carmichael et al. | 714/725 |
| 7,047,440 B1 | 5/2006 | Freydel et al. | |
| 7,221,607 B1 * | 5/2007 | Vernenker et al. | 365/189.16 |
| 7,257,763 B1 | 8/2007 | Srinivasan et al. | |
| 8,037,356 B2 | 10/2011 | Rasmussen et al. | |
| 8,112,678 B1 * | 2/2012 | Lewis et al. | 714/48 |
| 8,122,317 B1 * | 2/2012 | Clark et al. | 714/758 |
| 8,301,992 B2 * | 10/2012 | Bybell et al. | 714/801 |
| 2003/0061523 A1 | 3/2003 | Stanley | |
| 2004/0007743 A1 * | 1/2004 | Matsuda et al. | 257/369 |
| 2004/0103267 A1 | 5/2004 | Takata | |
| 2005/0021925 A1 * | 1/2005 | Clark et al. | 711/203 |
| 2005/0024928 A1 * | 2/2005 | Cummings et al. | 365/154 |
| 2006/0153068 A1 | 7/2006 | Dally et al. | |

(Continued)

OTHER PUBLICATIONS

An Area and Power Efficient Radiation Hardened by Design Flip-Flop; Jonathan E. Knudsen, and Lawrence T. Clark; IEEE Transactions on Nuclear Science, vol. 53, No. 6, Dec. 2006; pp. 3392-3399.

(Continued)

*Primary Examiner* — Scott Baderman
*Assistant Examiner* — Elmira Mehrmanesh
(74) *Attorney, Agent, or Firm* — Withrow & Terranova, P.L.L.C.

(57) ABSTRACT

Embodiments of circuits and method for dual redundant register files with error detection and correction mechanisms are described herein. Other embodiments and related examples are also described herein.

25 Claims, 11 Drawing Sheets

U.S. PATENT DOCUMENTS

| | | | |
|---|---|---|---|
| 2007/0162798 | A1 | 7/2007 | Das et al. |
| 2007/0260939 | A1 | 11/2007 | Kammann et al. |
| 2008/0250227 | A1 | 10/2008 | Linderman et al. |
| 2009/0006905 | A1* | 1/2009 | Luick .............................. 714/52 |
| 2009/0031163 | A1* | 1/2009 | Rashed et al. .................... 714/3 |
| 2009/0089642 | A1 | 4/2009 | Miles et al. |
| 2009/0183035 | A1 | 7/2009 | Butler et al. |

OTHER PUBLICATIONS

Reducing Radiation-Hardened Digital Circuit Power Consumption; John K. McIver III, and Lawrence T. Clark; IEEE Transactions on Nuclear Science, vol. 52, No. 6, Dec. 2005; pp. 2503-2509.

A 130-nm RHBD SRAM With High Speed Set and Area Efficient TID Mitigation; Karl C. Mohr, Lawrence T. Clark, and Keith E. Holbert; IEEE Transactions on Nuclear Science, vol. 54, No. 6, Dec. 2007; pp. 2092-2099.

Notice of Allowance for U.S. Appl. No. 12/626,479 mailed Sep. 6, 2012, 8 pages.

Non-final Office Action for U.S. Appl. No. 12/626,479 mailed May 23, 2012, 17 pages.

Non-final Office Action for U.S. Appl. No. 12/626,495 mailed Aug. 29, 2012, 32 pages.

* cited by examiner

| | | |
|---|---|---|
| Copy B | | Bits for parity checking |
| Copy A | | Bits for parity checking |
| Copy B | | Bits 7-0 |
| Copy A | | Bits 7-0 |
| Copy B | | RWL decoder/driver port Rt/Rd |
| Copy B | | RWL decoder/driver port Rs |
| Copy B | | RWL decoder/driver port Rt |
| Copy B | | WWL decoder/driver port Rt/Rd |
| Copy B | | Bits 15-8 |
| Copy A | | Bits 15-8 |
| Copy A | | RWL decoder/driver port Rt/Rd |
| Copy A | | RWL decoder/driver port Rs |
| Copy A | | RWL decoder/driver port Rt |
| Copy A | Pre-decode Local Clock Gen. | WWL decoder/driver port Rt/Rd |
| Copy B | | Bits 23-16 |
| Copy A | | Bits 23-16 |
| Copy B | | Bits 31-24 |
| Copy A | Sense Latch Write Circuits | Bits 31-24 |

CIRCUITS AND METHODS FOR DUAL REDUNDANT REGISTER FILES WITH ERROR DETECTION AND CORRECTION MECHANISMS

CROSS REFERENCE TO RELATED APPLICATIONS

This application claims priority to:
U.S. Provisional Patent Application 61/118,364, filed on Nov. 26, 2008;
U.S. Provisional Patent Application 61/118,360, filed on Nov. 26, 2008;
U.S. Provisional Patent Application 61/118,337, filed on Nov. 26, 2008; and
U.S. Provisional Patent Application 61/118,351, filed on Nov. 26, 2008.
The disclosure of each of the applications above is incorporated herein by reference.

GOVERNMENT FUNDING

The disclosure herein was funded with government support under grant number FA-945307-C-0186, awarded by the Air Force Research Laboratory. The United States Government may have certain rights in this application.

TECHNICAL FIELD

This disclosure relates generally to semiconductor memories, and relates more particularly to circuits and methods for dual redundant register files with error detection and correction mechanisms.

BACKGROUND

Space instrumentation has to operate in hazardous high-radiation environments. Depending on a particular mission this may encompass solar and cosmic radiation as well as trapped high energy electron & proton belts in the vicinity of planetary bodies. The inability to replace hardware failures on satellites means very rigorous instrument design and component selection is needed to ensure reliability during the mission timeline. Semiconductor circuits and devices, including complementary metal-oxide-semiconductor (CMOS) devices are often part of systems and devices used in such harsh environments. Other harsh environments include high altitude flight, nuclear power stations and battlegrounds. However, semiconductors are prone to damage from radiation. This is due to the very nature of semiconductors—typically small band gap materials operating with limited numbers of charge carriers. The effect of radiation in semiconductors is a complicated subject but generally speaking three effects can be identified:
1. Displacement Damage is cumulative long-term non-ionizing damage due to high energy particles. The impact of a high energy particle can create vacancy sites where recombination can occur. This can reduce the device performance and may eventually result in a non operation.
2. Short-term effects, such as single Event Effects (SEEs) (e.g. a Single Event Upset (SEU) or a single event transient (SET)): this can cause a bit flip (i.e. change in logic state) in an integrated circuit, thereby causing a loss of information The severity of this effect depends on the type of SEE. Another short-term effect, the dose ray effect, is caused by exposure of an entire integrated circuit to a flood of radiation, such as x-rays. This effect is typically related to short bursts (typically of the order of nanoseconds to milliseconds) of radiation, which can cause temporary, and in some cases permanent, failure of integrated circuits.
3. Total ionization damage where the impact of high energy particles results in electron-hole pair creation. In the case of powered metal-oxide-semiconductor field effect transistors (MOSFETs), electron diffusion can enhance conduction which can lead to permanent turn-on & associated high current consumption (known as 'latch up') resulting in device burn out and potential damage elsewhere. A cumulative measure of the damage is the Total Ionizing Dose (TID). Accumulation of radiation dose can trap charge carriers within semiconductor devices, for example, trapping generated charge in insulating $SiO_2$ regions of a device. This can cause shifts of the threshold voltage, leakage currents, timing skew and lead to permanent, functional failures of the circuit.

Radiation hardening by design (RHBD) employs layout and circuit techniques to mitigate TID and single-event effects, including single-event latchup (SEL). As mentioned above, a primary TID effect is positive charge accumulation in isolation oxides, shifting the threshold voltages of devices associated with the circuit, including parasitic devices. Transistor layouts that provide TID and SEL hardness are typically larger than the conventional two-edge transistors used for non-hardened ICs and increase active power as well as leakage over a non-hardened design. NMOS transistors are usually the most sensitive part of CMOS circuits to total dose effects, and efforts have been made to harden CMOS devices and circuits against total dose effects. Many techniques add further complex processing steps to the manufacturing process. Furthermore, the use of error detection and correction techniques can result in larger circuit sizes and slower performance of semiconductor circuits. Triple redundancy techniques or temporal sampling based design usually result in higher power and/or lower performance (e.g. slow clock rates).

It would be highly advantageous, therefore, to remedy the foregoing and other deficiencies inherent in the prior art.

BRIEF DESCRIPTION OF THE DRAWINGS

FIG. 5 shows an exemplary RF layout with decoders configured to reduce wordline resistance.

Figure 1:
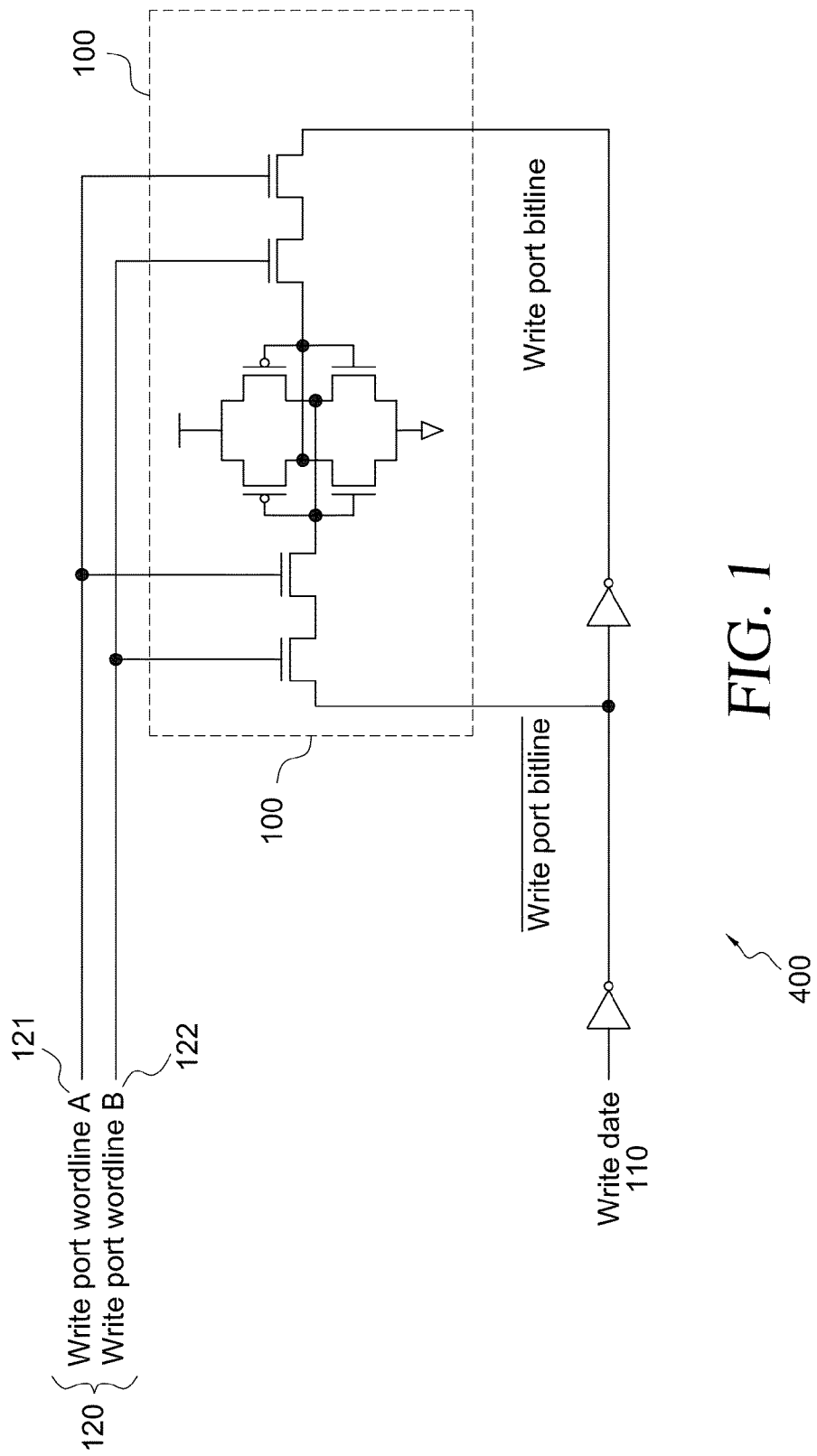
FIG. 1 shows an exemplary memory cell with dual redundant wordlines.

For simplicity and clarity of illustration, the drawing figures illustrate the general manner of construction, and descriptions and details of well known features and techniques may be omitted to avoid unnecessarily obscuring of the drawings. Additionally, elements in the drawing figures are not necessarily drawn to scale. For example, the dimensions of some of the elements in the figures may be exaggerated relative to other elements to help improve understanding of different embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the present disclosure are, for example, capable of operation in sequences other than those illustrated or otherwise described herein. Furthermore, the terms "include," and "have," and any variations thereof, are intended to cover a non-exclusive inclusion, such that a process, method, system, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in orientations other than those illustrated or otherwise described herein.

The terms "couple," "coupled," "couples," "coupling," and the like should be broadly understood and refer to connecting two or more elements, electrically, mechanically, and/or otherwise, either directly or indirectly through intervening elements. Coupling may be for any length of time, e.g., permanent or semi-permanent or only for an instant. The absence of the word "removably," "removable," and the like near the word "coupled," and the like does not mean that the coupling, etc. in question is or is not removable.

DETAILED DESCRIPTION

Protecting small fast memories such as register files from ionizing radiation induced upset is a key issue in the design of microcircuits for spacecraft. A dual redundant register file is presented using radiation hardened by design (RHBD) techniques that allows the speed of operation of commercial microcircuits, while mitigating both single event transients (SET) and storage node single event upset (SEU), collectively referred to as single event effects (SEE). Of particular concern is an inadvertent write to a stored word due to a control signal SET. This disclosure presents methods to detect and mitigate such errors, including the ability to back out incorrectly written data and to allow transparent real-time scrubbing to avoid accumulated SEU. Some of the circuits described are also applicable to larger memories, such as static random access memory (SRAM), which is also described. This dual redundant register file operates within a dual redundant pipeline, referred to here as the A- and B-pipes.

This disclosure relates to a radiation hardened by design register file (RF) that may be used in an integrated circuit as fast memory, or may, in particular, be embedded within some other component such as a microprocessor. Within a microprocessor, the RF may also be used in a translation lookaside buffer, write buffer, or be a constituent memory in another block or circuit structure.

Radiation hardening increases the immunity of a semiconductor device to radiation induced errors. A radiation induced error occurs in a semiconductor device when a high-energy particle travels through the semiconductor, leaving an ionized track behind. This ionization may cause a logic glitch in the output of a circuit, or cause a bit to flip to the opposite state in memory or a register. These "soft errors" do not cause damage to the device, but may cause a malfunction if the device is not able to recover from the error. When an ionizing radiation particle strikes a microcircuit, the collected charge may induce an error, which has a localized effect. Typically, only a handful of nodes in the circuit in a small area are impacted. This leads to various techniques that can be used for dealing with such errors, depending on where in the circuits the error occurs.

The disclosure herein is based on a couple of assumptions, as follows:

1. When an ionizing radiation particle strikes the integrated circuit (IC), it will affect a relatively small region of the chip, causing a finite, e.g., less than half a dozen, neighboring nodes to flip to an erroneous value. Circuits that must not be corrupted when a neighboring circuit is corrupted are thus spaced sufficiently far apart such that a radiation induced error will affect at most one of the two circuits for events at probabilities that meet standard on-orbit mean-time-to failure (MTTF) requirements, e.g., $10^{-9}$ errors/bit-day. For example, dual redundant wordline drivers and associated circuitry are thus spaced sufficiently far apart such that a radiation induced error will affect at most one of the dual redundant wordlines. Note that in a space environment, a heavy ion can pass through the circuit at an angle which is essentially parallel to the IC surface. In this case it may upset a very large number of nodes, and at just the right angle this may upset a sufficient number of just the right nodes to make error recovery impossible. Thus, while the apparatus and methods described herein can make such faults statistically very unlikely, it does not make them impossible.

2. When an error occurs due to a single ionizing particle radiation track, it will not be followed by another error for many processor clock cycles. This assumption essentially means that when an error occurs, there is sufficient time to recover from the error before another error occurs.

The above assumptions are valid for high probability ionizing radiation particles incident in a space environment.

In one embodiment of the present disclosure, a memory device comprises a first memory element and a second memory element, wherein the first and second memory elements are redundant to each other. The first memory element can comprise a first bit group of memory cells, and the second memory element can comprise a second bit group of memory cells, where the memory cells of the second bit group are redundant with, and correspond to, the memory cells of the first bit group. There can be examples where the first memory element comprises a first scanning port configured to enable handling of an error of at least one of the first or second memory elements, and where the second memory element also comprises a second scanning port configured to enable handling of the error. The memory device can also comprise an error handling circuit coupled to the first and second scanning ports, where the error handling circuit can comprise an error identification circuit configured to scan the first and second scanning ports to detect a corrupt bit group, and a feedback circuit configured to overwrite the corrupt bit group with a noncorrupt bit group. The corrupt bit group comprises one of the first or second bit groups, and the noncorrupt bit group comprises another one of the first or second bit groups. In some examples, the first memory element can comprise a first register file, and the second memory element can comprise a second register file. In another example, the first memory element can comprise a first SRAM memory, and the second memory element can comprise a second SRAM memory.

In the same or other embodiments, a method involving a memory device can comprise providing the memory device, scanning with a mismatch checking circuit for a dual redundant mismatch between first and second register portions of the memory device, and/or executing an error handling operation when the dual redundant mismatch is detected. Providing the memory device can comprise, in different sequences: (1) providing a first register file comprising the first register portion of a first dual redundant register of one or one or more dual redundant registers, the first register portion comprising one or more first parity groups of memory cells, (2) providing a first read port of the first register file coupled to a first scanning bitline of the first register portion, (3) providing a first write port of the first register file coupled to a first bitline of the first register portion, (4) providing a second register file redundant with the first register file and comprising the second register portion of the first dual redundant register, the second register portion comprising one or more second parity groups of memory cells, the second register portion redundant with the first register portion, (5) providing a second read port of the second register file coupled to a second scanning bitline of the second register portion, (6) providing a second write port of the second register file coupled to a second bitline of the second register portion; (7) providing the mismatch checking circuit coupled to the first and second read ports, and/or (8) providing an error handling circuit coupled to the first and second write ports to execute a read error handling operation for recovering corrupt bits of the first and second register files. In some examples, executing the error handling operation can comprise, in different sequences: (1) identifying with the error handling circuit corrupt parity groups of the first and second parity groups, and noncorrupt parity groups of the first and second parity groups, (2) overwriting the corrupt parity groups with corresponding noncorrupt parity groups, and/or (3) repeating the error handling operation for other dual redundant registers of the first and second register files.

In the same or other embodiments, a method involving a memory device can comprise providing the memory device, and providing a scrub circuit to implement a scrub pointer of a scrubbing operation for periodically scanning for corrupt registers of one or more dual redundant registers of the memory device. Providing the memory device can comprise, in different sequences: (1) providing a first register file comprising a first register portion of a first dual redundant register of one or one or more dual redundant registers, and (2) providing a second register file redundant with the first register file and comprising a second register portion of the first dual redundant register, the second register portion redundant with the first register portion. The scrubbing operation can comprise, in different sequences: (1) reading the first and second register portions of the first dual redundant register when the scrub pointer points to the first dual redundant register, (2) determining whether the first dual redundant register is corrupt due to a dual redundant mismatch between the first and second register portions, (3) executing an error handling operation to overwrite corrupt parity groups of the first dual redundant register with corresponding noncorrupt parity groups of the first dual redundant register, and/or (4) updating the scrub pointer to point to a next dual redundant register of the one or more dual redundant register. In some examples, the scrubbing operation can be executed during a current cycle unless a next sequential cycle, relative to the current cycle, comprises a write operation to the first dual redundant register.

In the same or other embodiments, a method involving a memory device can comprise providing the memory device, and providing a backup circuit to execute a write error handling operation for the first dual redundant register, the backup circuit comprising a holding register coupled to the first dual redundant register. In some examples, providing the memory device can comprise, in different sequences: (1) providing a first register file comprising a first register portion of a first dual redundant register of one or one or more dual redundant registers, (2) providing a second register file redundant with the first register file and comprising a second register portion of the first dual redundant register, the second register portion redundant with the first register portion, and/or (3) providing first and second wordlines redundant to each other, each of the first and second wordlines coupled to control write ports for each of the first and second register portions of the first dual redundant register. The write error handling operation can comprise, in different sequences: (1) copying the first dual redundant register to the holding register when a next sequential cycle, relative to a current cycle, comprises a write operation to the first dual redundant register, (2) comparing the first and second register portions of the first dual redundant register to detect a first dual redundant mismatch between the first and second register portions, (3) if the first dual redundant mismatch is detected, then executing an error handling operation to overwrite corrupt parity groups of the first dual redundant register with corresponding noncorrupt parity groups of the first dual redundant register, (4) executing the write operation to the first dual redundant register, (5) comparing the first and second wordlines to detect a second dual redundant mismatch between the first and second wordlines, and/or (6) if the second dual redundant mismatch is detected, then copying the holding register to the first dual redundant register before restarting the write operation to the first dual redundant register. The first holding register can be spatially separated from a writepath to the first dual redundant register to restrict concurrent corruption of data in the holding register and in the first dual redundant register.

Figure 2:
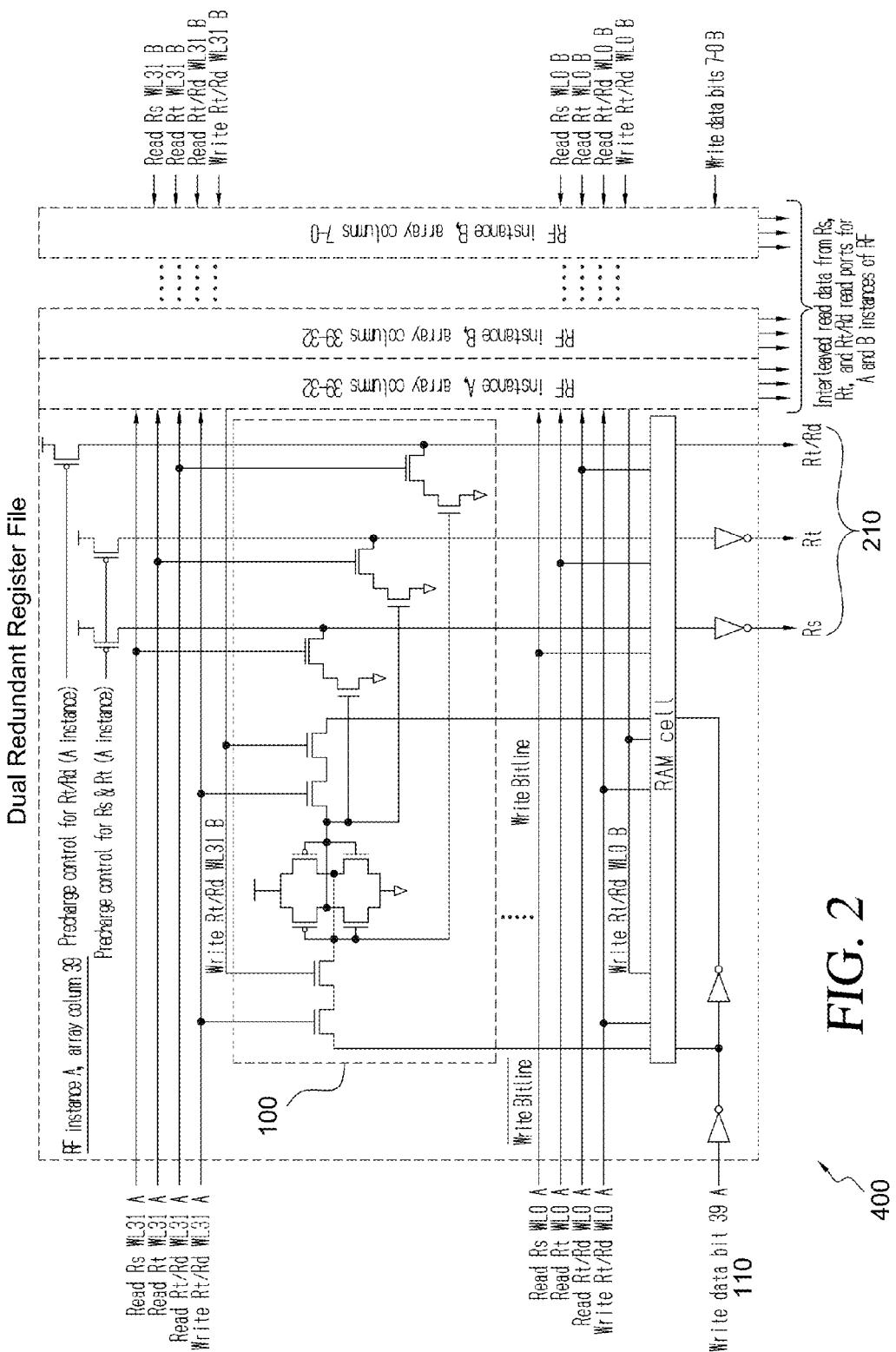
FIG. 2 shows a high level view of an exemplary register file (RF) array.
Figure 4:
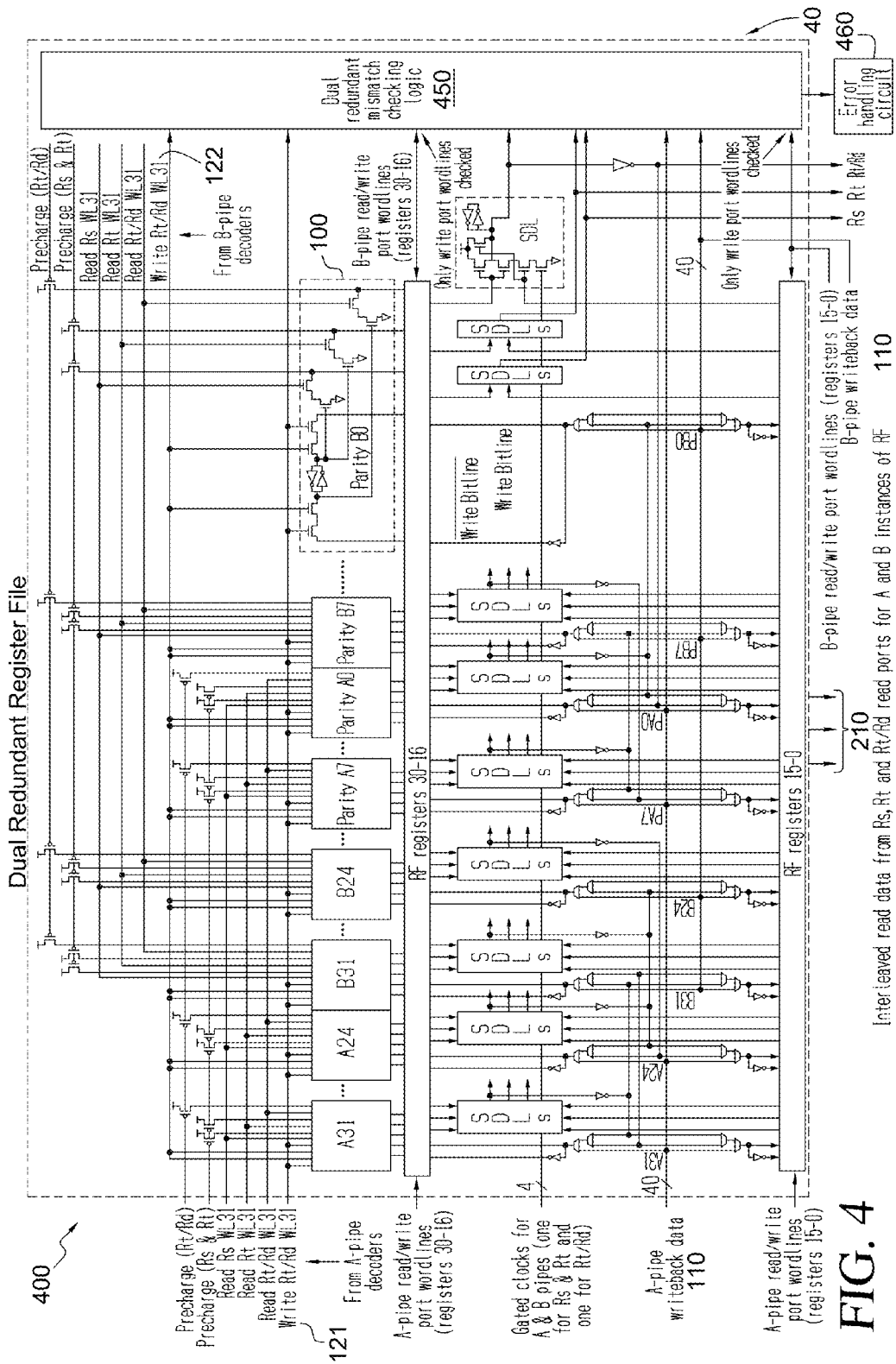
FIG. 4 shows a schematic of an exemplary RF layout.

Moving on to the figures, in one exemplary embodiment, a Register File Unit (RFU) such as shown in FIG. 4 for RFU 40 can house a microprocessor's 32 general purpose registers. It consists of a dual redundant 32-entry register file (RF) 400, with each entry corresponding to 1 of the 32 general purpose registers. As seen in FIG. 2, RF 400 has 3 read ports 210 and 1 write port 110. The read ports are labeled 'Rs', 'Rt', and 'Rt/Rd'. The 's' in Rs stands for 'source', the 't' in Rt stands for 'target', and the 'd' in Rd stands for destination. The Rt register specified in the instruction may be used both as a source and target register, depending on the instruction. For example an add instruction uses Rs and Rt as source operands and writes its result to the RF, whereas a load instruction uses Rs as a source operand to compute a memory address and will write the value loaded from memory to Rt. The Rs and Rt read ports are used to read source operands in the high phase of the clock in the pipeline stage when the source operands are read, and the Rt/Rd read port is used to read the destination register of an instruction in the high phase of the clock in the pipeline stage prior to when the RF is written. The latter is used for both misaligned loads (where a read-modify-write operation is required) and error correction.

When an instruction presently in the pipeline stage prior to when the RF is written will not write to the register file in the next pipeline stage (e.g., a store instruction), the Rt/Rd read port is used to opportunistically read a register in the high phase of the clock for scrubbing purposes. In other words, all registers are sequentially read in a rotating fashion through the Rt/Rd read port when it is not being used by an instruction, and are checked for errors. This hardware scrubbing mechanism is used to minimize the chance of multiple bit errors accumulating in such a way that error recovery would no longer be possible. The write port is also labeled 'Rt/Rd' and is written in the high phase of the clock in the pipeline stage during which the RF is written. This labeling may seem to conflict with the Rt/Rd read port, but the idea here is that the destination register about to be written in the next cycle via the write port is the one being read out through this read port, which is why they share the same label. The differentiation between the two ports is made by one of them being a read port and the other a write port. The RF is dual redundant for radiation hardening purposes. In most processor pipelines, the register file holds the machine architectural state, which is not stored elsewhere, i.e., if upset, the machine may no longer function correctly. As a result, special care must be taken to ensure that this architectural state does not become corrupted.

Radiation Hardening Features

For radiation hardening purposes, the exemplary RF has the following features:
1. It is dual redundant with dual redundant wordlines used in the write port of each instance of the RF to prevent writes to the wrong register(s). In other words, both dual redundant wordlines must be asserted for a write into a cell to take place. Checking logic is used to detect mismatches between certain dual redundant inputs and outputs to/from the dual redundant RFs.
2. The Rt/Rd read port is used to read out the destination register in the cycle prior to the write of that register, and this value is saved in storage outside the RF. This is done for the case where an SEE corrupts one instance of the write data in the RF write cycle. When this happens, the non-corrupted data that was read out via the Rt/Rd read port and saved in separate storage is restored in the RF and the instruction associated with the corrupted write is subsequently restarted (along with all subsequent instructions currently in flight in the pipeline). Another embodiment to this readout mechanism prior to a register update is to enforce spacing between bits in the RF writeback path that ensures at most one bit per parity group may be corrupted due to an SEE. In this case, parity could be used to detect which instance of the dual redundant write data was corrupted, and could thus be used to repair the corrupted entry. Other register files may vary the number of ports depending upon the application, while still utilizing the techniques described here.
3. Parity protection with a large minimum spacing between bits belonging to the same parity group is used to protect the register file storage cells. In one embodiment, eight parity bits per register are used for a total of 40 bits per register. When a dual redundant mismatch is detected on the data read out during a register file read, parity is used to determine the good copy. The error handling logic then flushes the processor pipeline and writes the good copy of the data over the bad one. All registers are automatically checked by the error handling logic in this case, as it's possible that multiple registers were corrupted. This minimizes the chance of allowing undetectable multi-bit errors to accumulate over time, e.g., by multiple lucky hits striking the same word in such a way as to render it uncorrectable.
4. To minimize the probability of multiple bit errors accumulating over time in registers that have not been read for a while, the hardware will opportunistically scrub the RF using the Rt/Rd read port when it is not in use. This scrub mechanism consists of a state machine that reads a single register at a time and checks for errors when an unused Rt/Rd read port pipeline slot opens up. This background scrub mechanism cycles through all registers over time using a counter to keep track of the next register to be read.

Cell Write Protection Scheme for Wordline Soft Errors in SRAM or RF Memory Cells The scheme presented here is used to prevent an SRAM or other memory cell, such as cell 100 in FIG. 1, from being written when a radiation induced error occurs on a wordline (WL) used to access the cell (this scheme is also applicable to other clock nodes as will be apparent to those skilled in the art). Such an error may cause a wordline (or other clocked control signal) to be asserted when it should not be. To prevent erroneous writes of this type, dual redundant wordlines are used to enable writes to each SRAM cell in the array. Each wordline has a copy, and both the wordline and its dual redundant copy must be asserted before the SRAM cell may be written. If one wordline is corrupted resulting in an incorrect assertion, the other wordline will prevent the erroneous write that would have otherwise occurred by remaining de-asserted. The wordlines are compared in each cycle to detect when this happens. When a wordline is erroneously asserted, no further action is required since a write was not actually intended. When a wordline is erroneously de-asserted, the failed write can be detected and re-executed to get the correct data into the memory row.

FIG. 1 shows an exemplary SRAM cell 100 with dual redundant wordlines 120 on its write port 110 driving dual series access transistors to access the cell. Note that the scheme is also applicable to SRAM cells where the port is combination read and write. In FIG. 1, the bitlines are shown only for the write port 110 for the purpose of illustration. For a write to occur to this cell, both wordline A (121) and wordline B (122) for the write port must be asserted. If one of these wordlines is erroneously asserted due to a radiation induced error, a write will not happen since the other redundant wordline will remain de-asserted. Conversely, if one of these wordlines is erroneously de-asserted due to a radiation induced error, a write will not occur, although it should. By detecting a mismatch between the dual redundant wordlines, the write may be re-tried. A minimum spacing requirement between the drivers and associated circuitry for these two wordlines must be met to minimize the probability that both wordlines are simultaneously corrupted.

Note that the scheme is also applicable if the SRAM cell uses the same bitlines for read and write. In fact, SRAM cell stability is easier to ensure by the series NMOS transistor connections, since this makes it easier to make the pull down NMOS transistors within the cell stronger than the access transistors. The use of this technique in the register file is described below and illustrated in FIG. 2. For the case where the bitlines are shared for read and write operations, if only one of the wordlines is asserted during a read, this condition can be detected using an appropriate parity or error detection and correction (EDAC) scheme.

Register File Organization

A very high level 'functional' view of one embodiment of the dual redundant array for RF 400, with one instance labeled 'A' and the other instance labeled 'B', is shown in FIG. 2. Note the dual access transistors on the write port as described above.

FIG. 2 does not reflect the detailed physical organization, which is presented in subsequent sections. The intent here is primarily to show the high level organization of the RF. A key point of interest is that two wordline assertions are required to write to the cell; each wordline corresponds to one instance of the RF. This prevents writes when a dual redundant wordline mismatch occurs.

The RF is designed with radiation hardening as a key requirement. Since as mentioned, the RF maintains architectural state that is not available elsewhere, it's crucial to be able to detect and correct radiation induced errors.

Register File Bit Interleaving

Figure 3:
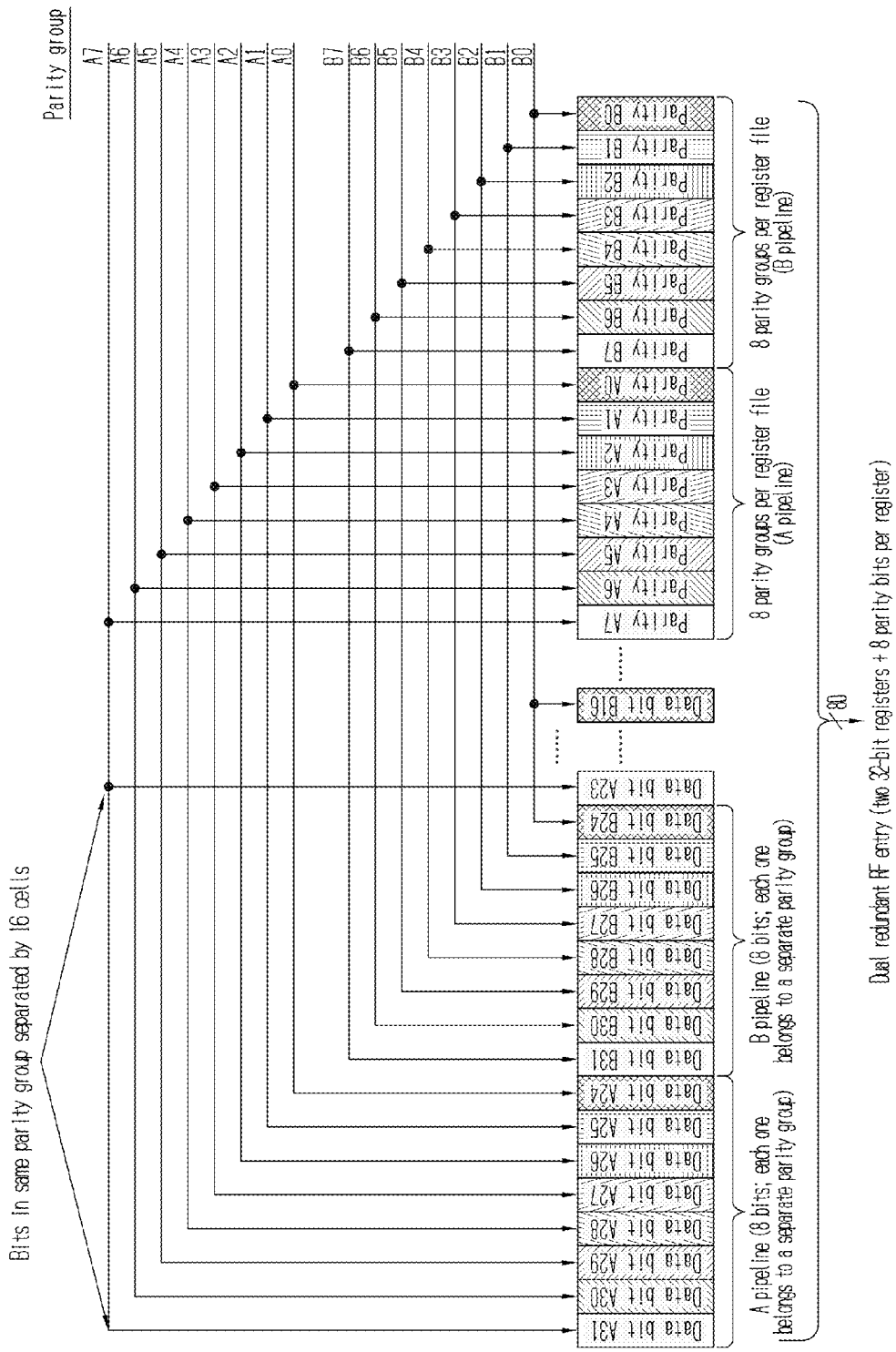
FIG. 3 shows an example of RF bit interleaving.

In one embodiment, each row of RF 400 can correspond to a single dual redundant register, and can be organized as shown in FIG. 3. In one embodiment, a separation of 8 cells is used between dual redundant counterparts. This results in 8 parity groups per register. With the interleaving between A- and B-pipelines, this actually creates a separation of 16 cells between bits belonging to the same parity group. Since each register is 32 bits wide and there are 8 parity bits per register, the total width of a register is 40 bits and the total width of a dual redundant RF entry is 80 bits. Note that an SEU could result in the corruption of both dual redundant registers. However, this can only happen within the expected low MTTF across different parity groups, for which at most one bit per parity group should be affected. As a result the error is not only detectable, but also correctable since the same parity group should not be corrupted in both instances of the register. The parity groups from the A- and B-pipes along with their corresponding register bits are shown in Table 1.

TABLE 1

RF parity groups

| Parity Group | Register Bits |
| --- | --- |
| A7 | A31, A23, A15, A7, Parity A7 |
| A6 | A30, A22, A14, A6, Parity A6 |
| A5 | A29, A21, A13, A5, Parity A5 |
| A4 | A28, A20, A12, A4, Parity A4 |
| A3 | A27, A19, A11, A3, Parity A3 |
| A2 | A26, A18, A10, A2, Parity A2 |
| A1 | A25, A17, A9, A1, Parity A1 |
| A0 | A24, A16, A8, A0, Parity A0 |
| B7 | B31, B23, B15, B7, Parity B7 |
| B6 | B30, B22, B14, B6, Parity B6 |
| B5 | B29, B21, B13, B5, Parity B5 |
| B4 | B28, B20, B12, B4, Parity B4 |
| B3 | B27, B19, B11, B3, Parity B3 |
| B2 | B26, B18, B10, B2, Parity B2 |
| B1 | B25, B17, B9, B1, Parity B1 |
| B0 | B24, B16, B8, B0, Parity B0 |

Register File Layout

The RF layout of the present embodiment is shown schematically in FIG. 4 for RF 400. In some examples, the decoders are separated from each other to avoid a single ionizing particle from inducing the same error in both. For ease of matching this block to the associated IC data path, the decoders can be placed at the outer edges. To reduce the wordline resistance, the decoders may be placed inside the register file as shown in FIG. 5. In this way the worst-case metal routing resistance and capacitance between each cell and its associated driving decoder is reduced.

In one embodiment, the dual redundant RF is split into an upper half (registers 31-16) and a lower half (registers 15-0). The decoder for one instance of the RF is located on the left side and the decoder for the other instance is located on the right side to maintain spatial separation between the two. Dual redundant mismatch checking logic 450 also sits on the side. This is used to check the write port wordlines 120, the writeback data for write port 110, and the data for the 3 read ports 210 (with the latter being specific to one embodiment, but not all). Bits from each register are interleaved as presented above. A write to a register is enabled only when both dual redundant wordlines are asserted, i.e., when no mismatch occurs during the assertion. In one embodiment, the bitlines for the Rs, Rt, and Rt/Rd read ports are precharged in the low phase of every clock, and these read ports are read in the high phase of the clock when they are read. The read data for each register bit is latched into a two input NANDing Set Dominant Latch (SDL) (two inputs are provided and the output is the latched value of the two inputs ANDed and inverted). One input to this latch is from the bitline associated with the upper registers and the other input is from the bitline associated with the lower registers. Since at most one of these two bitlines should be discharged during a read, the SDL will correctly reflect the read value.

The path into the write port can select 1 of 3 data sources: (1) the writeback data used during normal operation, (2) the data from the dual redundant cell, and (3) the data from the cell itself. When an RF error is detected, the pipeline is flushed and a state machine is used to repair the RF. This is done by reading all 32 registers and performing a dual redundant comparison for each value read out. Whenever a dual redundant mismatch is detected, all 8 parity groups are examined in both the A- and B-pipes. If a parity group in the A-pipe shows an error and the corresponding B-pipe group does not show an error, the group in question is copied from the B-pipe to the A-pipe (and vice-versa for the opposite case). If the same parity group shows a parity error in both A- and B-pipes, the error is unrecoverable and will be signaled to the external system. The statistical likelihood of such an event is extremely small due to the spatial separation used between cells. During the RF repair process, an entire register is written in both instances. As a result, for each parity group within a register, one must be able to select the non-corrupted parity group to be written into the register. This can come from the register itself or from its dual redundant counterpart (since both registers can have non-overlapping portions that are corrupted), which is why both sources must be available during the RF repair. During this repair process, the Rt/Rd read port is used to read out each register. The output of the corresponding SDL is then fed back inside the RF to multiplexors that are used to select the non-corrupted data source. Note that this requires the SDL output to be held latched during the write in the high phase of the clock. As a result, when writing a register to fix data corruption, the next register in sequence cannot be read at the same time. Otherwise, the value held in the latch would be lost during the write and an incorrect value would be written. This essentially means that the repair process cannot be pipelined. Since this error correction operation should be an infrequent occurrence, the performance impact on the overall processor throughput is negligible.

Dual Redundant Error Detection and Correction

In one embodiment of the RF, the following dual redundant signals are checked for mismatches:

the Rt/Rd write port wordlines;
the Rt/Rd write port writeback data coming in to the RF (including the 8 parity bits);
the Rs read port data from the output of the SDL (including the 8 parity bits);
the Rt read port data from the output of the SDL (including the 8 parity bits); and
the Rt/Rd read port data from the output of the SDL (including the 8 parity bits).

Figure 6A:
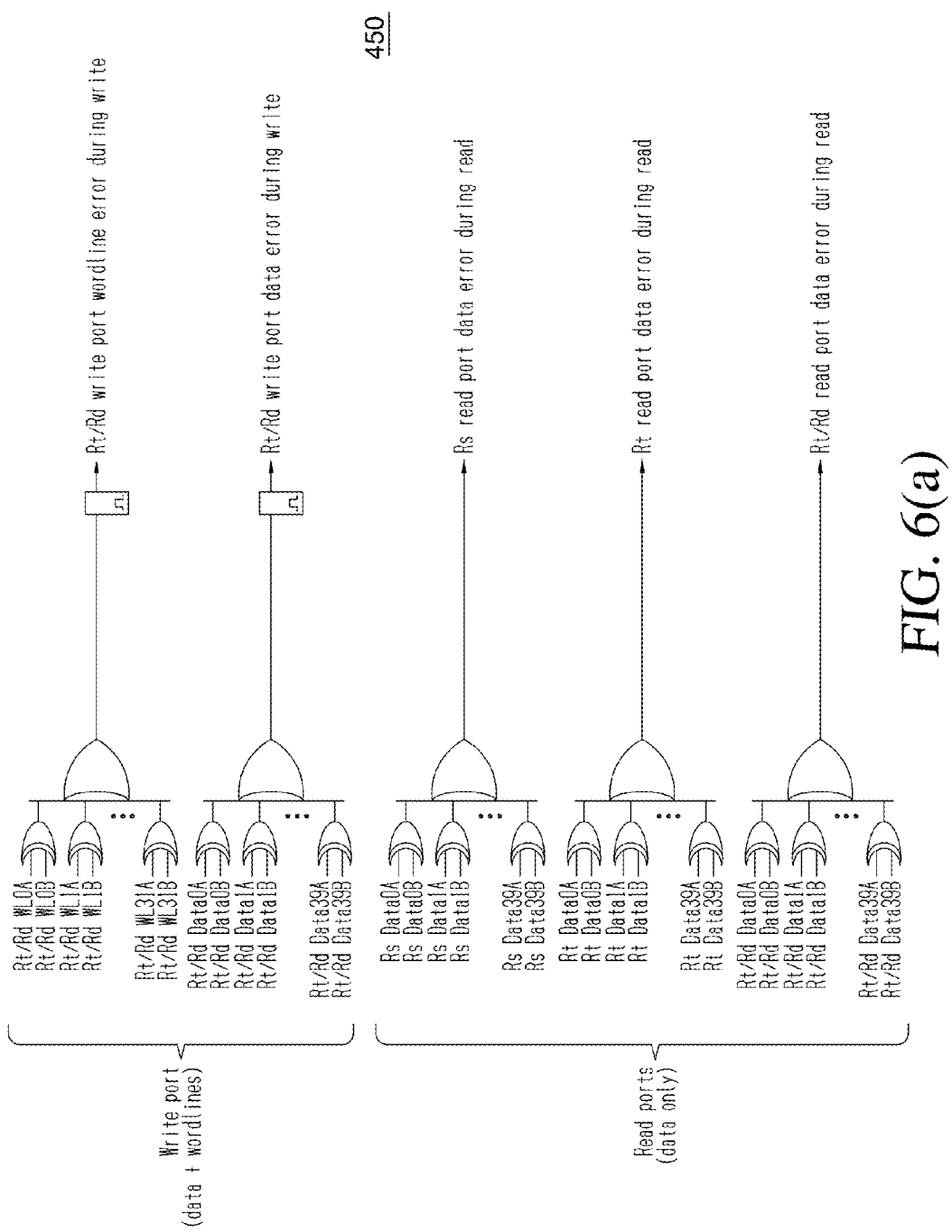
FIG. 6A shows an example of static dual redundant checking.
Figure 6B:
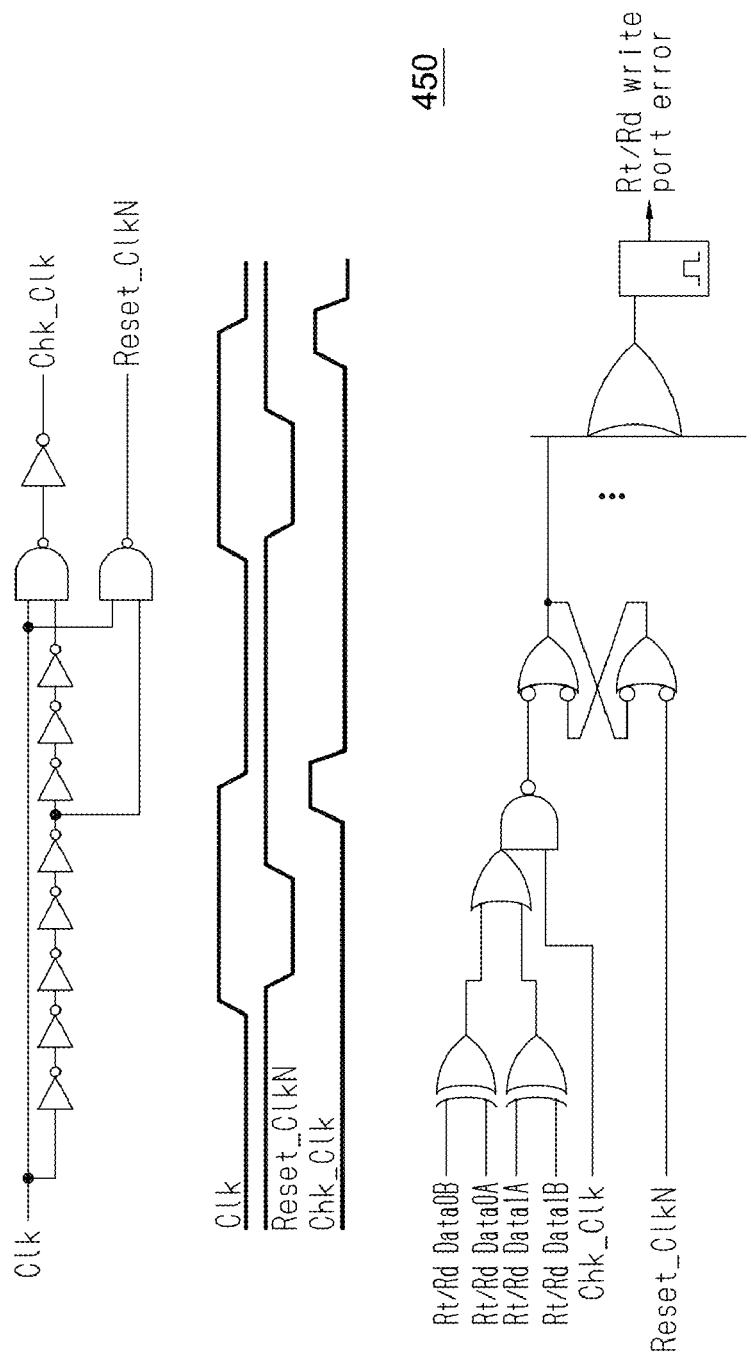
FIG. 6B shows an exemplary timing circuit, along with related generated waveforms and an exemplary static circuit to check the write data.

The dual redundant mismatch checking logic 450 is shown in more detail in FIGS. 6A and 6B. FIG. 6A shows an example of static dual redundant checking Note that the data is only checked at approximately the READ/WRITE window (when the RF cell capturing latch closes) so that other minor timing mismatches are not flagged as errors. FIG. 6B shows (top) an exemplary timing circuit, (middle) the generated waveforms, and (bottom) an exemplary static circuit to check the write data. The checking circuit can be used for the WL checker as well.

In another embodiment, the read ports do not need to be checked for dual redundant mismatches. Instead, a dual redundant mismatch will be allowed to propagate down the processor pipeline up to the RF writeback stage. During the writeback stage, a dual redundant mismatch is checked on the writeback data, and it is at this point that the error is detected and the pipeline is flushed with the offending instruction and subsequent instructions in flight restarted.

As mentioned, mismatches in the dual redundant data to be written must be detected to prevent the architectural state from being corrupted. The basic approach is shown in FIG. 6(a) which comprises bit-wise comparators for the dual redundant RF signals.

Various circuits can be used to detect that the signals mismatch when the cell is written. One embodiment is described here, which is a static circuit (see FIG. 6(b) bottom). The timing generation circuit at the top resets the SR latch by asserting signal Reset_ClkN low indicating that no error has occurred. In the event that the bits mismatch, i.e., the output of the XOR gate is high during the timing window created by signal Chk_Clk then the SR latch output is set high. This particular embodiment allows two bits to be checked with one latch. Other combinations are possible. The latch outputs are combined with a large OR or NOR gate, which combines the many error signals to one. This combined signal triggers the actual error detection, which flushes the pipeline and triggers a RF repair operation. Subsequently, the flushed instructions are restarted.

Adding dual redundant mismatch checking in the read port wordlines can add the ability to distinguish between array errors and wordline errors. Array errors require the RF logical state to be repaired (more on this below) whereas read port wordline errors only require flushing the pipeline and restarting the instructions in flight. However, handling all read port errors in the same manner reduces the amount of logic and complexity required. Since such errors should be very infrequent, there will not be any noticeable performance degradation in taking this approach. Note that there is only a single instance of the dual redundant checking logic shown in FIG. 6. If an SEE causes one of the error outputs to be erroneously asserted, this simply results in a false error, which will invoke the scrub and correct mechanism with no harm done (this is infrequent enough so that the overall performance penalty is negligible).

Figure 7:
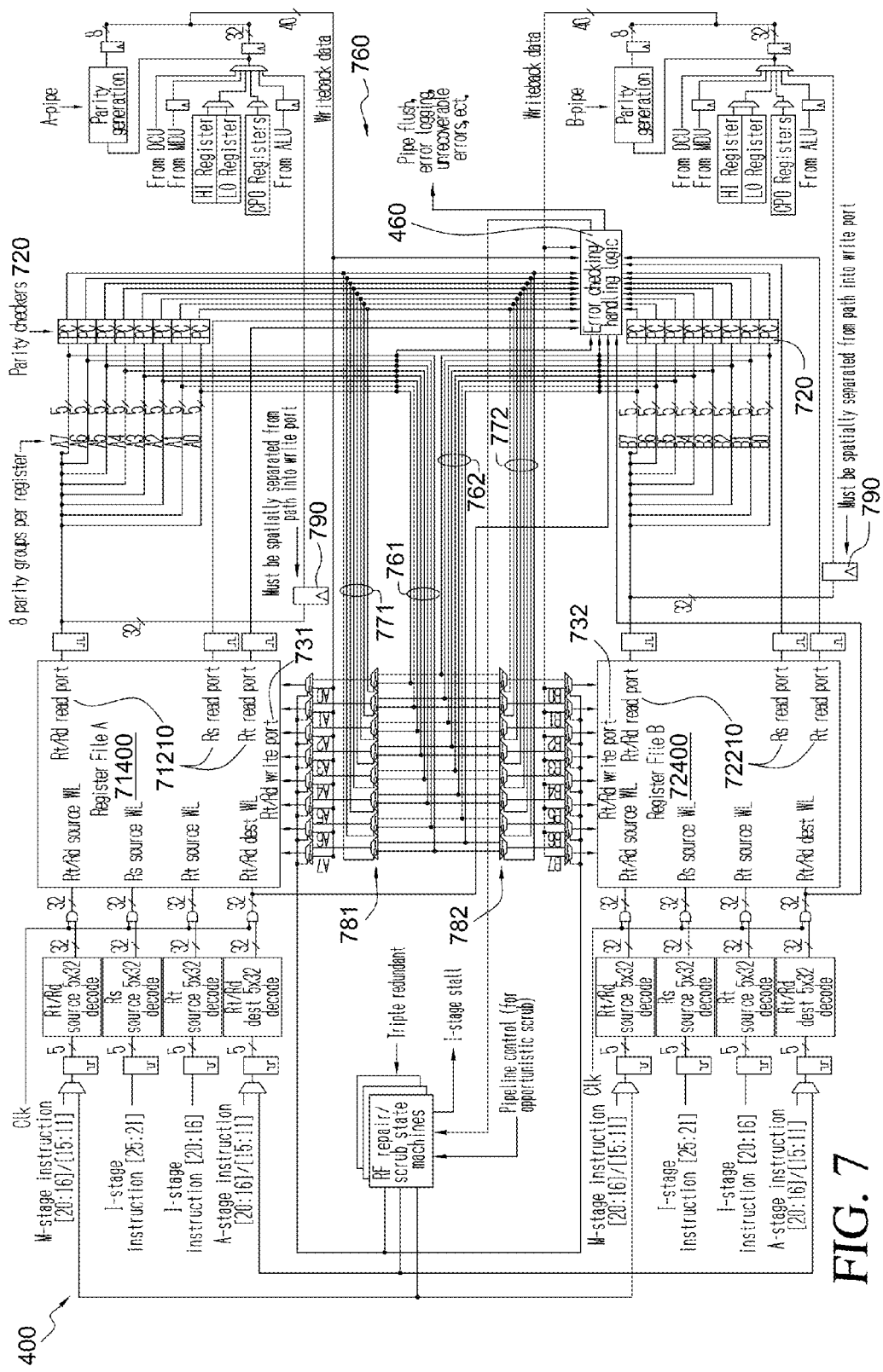
FIG. 7 shows exemplary RF error detection and correction circuitry.

A higher level functional view of one embodiment of the dual redundant RF 400 with error detection and correction logic 460 is shown in FIG. 7. FIG. 7 shows how RF 400 is schematically subdivided into register file A (71400) and register file B (72400), where register files 71400 and 72400 are redundant to each other. In practice, however, register files A and B can be arranged as shown in FIG. 3-5, where bit cells for register files A and B are interleaved with each other. Certain elements of the design and pipeline stage references are not discussed here, in order to keep the description straightforward.

In the present example, whenever a mismatch is detected, the pipeline is flushed. The pipeline is then stalled to prevent it from advancing while the register file correction mechanism 760 operates.

When a dual redundant mismatch is detected on any of the read ports 71210 or 72210, as described with respect to the bottom portion of FIG. 6(a), a state machine is used to repair the RF stored logic state.

In one case it is possible that the RF itself was not corrupted, but something else leading to the read path out of the array was. Such a situation may only require flushing the pipe and restarting the instructions that were in flight at the time. However, to minimize the complexity of the error handling logic (and minimize the probability of introducing speed critical paths) this state machine can be enabled to correct a potential error whenever a dual redundant mismatch is detected on any of the 3 read ports. In another embodiment where dual redundant checking is not done on read ports 71210 and 72210, error correction is only enabled when dual redundant errors are detected on the write port wordlines or data, as described with respect to the top portion of FIG. 6(a).

Since errors may span more than one parity group and cover both dual redundant registers, the parity group checkers 720 for the Rt/Rd read ports are used to steer the non-corrupted parity groups into write ports 731-732 during the repair process. For example, one parity group may come from A-pipe 761 while a different parity group comes from the B-pipe 762. Note that parity checkers are only required on the Rt/Rd read port since this is the read port used during the repair process. Also note that only the A-pipe parity checkers are used in this steering process. The assumption here is that since an SEE recently happened, it is very unlikely that another SEE will corrupt these checkers during the repair process. Parity checkers are included in the B-pipe for the Rt/Rd read port to check for the case where parity is corrupted in the same group in both pipes. Although extremely unlikely, this would result in an unrecoverable error. In the event of this occurrence, the processor is halted and the error will be signaled to the external system.

Figure 8:
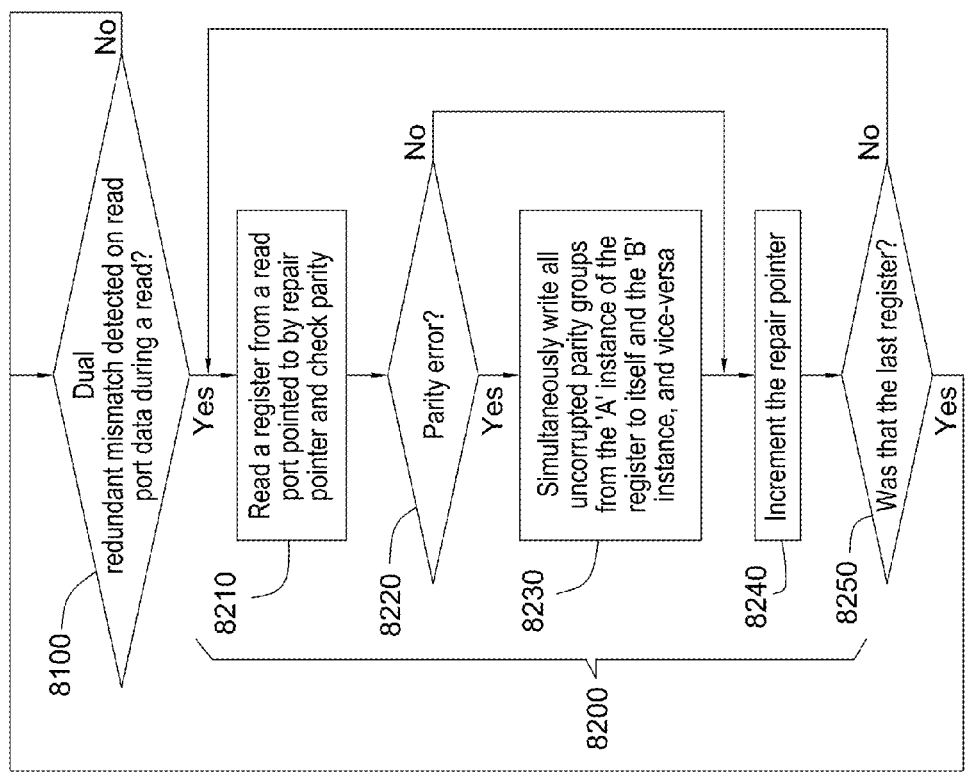
FIG. 8 shows a flowchart for a method for handling dual redundant mismatches detected between read ports of a dual redundant register file.

A flowchart illustrating the error detection and correction mechanism that occurs when a dual redundant mismatch is detected on a read port during a read is shown as method 8000 in FIG. 8.

Block 8100 of method 8000 comprises detecting whether a dual redundant mismatch has occurred on read port data during a read operation. In some examples, block 8100 can be implemented using a circuit such as dual redundant mismatch checking logic 450 (FIG. 4), and/or as further detailed in the comparison of read ports in bottom half of FIG. 6(a). In some examples, dual redundant mismatch checking logic 450 can be referred to as a mismatch checking circuit.

If the dual redundant mismatch is detected in block 8100, method 8000 can continue by executing read error handling operation 8200, such as through error handling circuit 460 (FIGS. 4, 7) to operate register file correction mechanism 760 (FIG. 7). Read error handling operation 8200 comprises block 8210 for reading a register from a read port pointed to by a repair pointer to check parity. The read port can be a third read port or a scanning port of the register. In the present example, where the register can be read out from register files A (71400) and B (72400) via their respective Rs/Rd read ports and into error handling circuit 460.

Read error handling operation 8200 of method 8000 also comprises block 8220 for determining whether there is a parity error in one or more redundant parity groups form the register that was read out in block 8210. In the present example, block 8220 is carried out by first ones of parity checkers 720 (FIG. 7) that check parity groups A0-A7 from register file A (71400) and second ones of parity checkers 720 that check parity groups B0-B7 from register file (B). With the information from parity checkers 720, error handling circuit 760 can determine which parity groups are corrupt and which parity groups are non-corrupt between register files A and B.

If a parity error is detected, read error handling operation 8200 can then continue with block 8230 for simultaneously writing all uncorrupted parity groups from the 'A' instance of register file A (71400) to the 'B' instance of register file B (72400), and vice-versa. There can be examples where block 8230 need not be performed simultaneously for the parity groups of register files A and B. In the present example, block 8230 is performed by actuating respective control signals 771 and 772 to control multiplexors 781 and 782 so that only non-corrupt parity groups in feedback loops 761 and 762 are selected to be written back into respective write ports 731-732 of register files A and B. In the present example of FIG. 7, the non-corrupt parity groups can be selected and copied in accordance with Table 2 as follows:

TABLE 2

Actions to repair errors detected in RF parity groups.

| Parity Error detected in parity | Action |
| --- | --- |
| A7 | Copy B31, B23, B15, B7, Parity B7 to A31, A23, A15, A7, Parity A7, respectively |
| A6 | Copy B30, B22, B14, B6, Parity B6 to A30, A22, A14, A6, Parity A6, respectively |
| A5 | Copy B29, B21, B13, B5, Parity B5 to A29, A21, A13, A5, Parity A5, respectively |
| A4 | Copy B28, B20, B12, B4, Parity B4 to A28, A20, A12, A4, Parity A4, respectively |
| A3 | Copy B27, B19, B11, B3, Parity B3 to A27, A19, A11, A3, Parity A3, respectively |
| A2 | Copy B26, B18, B10, B2, Parity B2 to A26, A18, A10, A2, Parity A2, respectively |
| A1 | Copy B25, B17, B9, B1, Parity B1 to A25, A17, A9, A1, Parity A1, respectively |
| A0 | Copy B24, B16, B8, B0, Parity B0 to A24, A16, A8, A0, Parity A0, respectively |
| B7 | Copy A31, A23, A15, A7, Parity A7 to B31, B23, B15, B7, Parity B7, respectively |
| B6 | Copy A30, A22, A14, A6, Parity A6 to B30, B22, B14, B6, Parity B6, respectively |
| B5 | Copy A29, A21, A13, A5, Parity A5 to B29, B21, B13, B5, Parity B5, respectively |
| B4 | Copy A28, A20, A12, A4, Parity A4 to B28, B20, B12, B4, Parity B4, respectively |
| B3 | Copy A27, A19, A11, A3, Parity A3 to B27, B19, B11, B3, Parity B3, respectively |
| B2 | Copy A26, A18, A10, A2, Parity A2 to B26, B18, B10, B2, Parity B2, respectively |
| B1 | Copy A25, A17, A9, A1, Parity A1 to B25, B17, B9, B1, Parity B1, respectively |
| B0 | Copy A24, A16, A8, A0, Parity A0 to B24, B16, B8, B0, Parity B0, respectively |

Read error handling operation 8200 then continues with block 8240 for incrementing the repair pointer so that operation 8200 can then be repeated for the next register. Block 8250 terminates operation 8200 if operation 8200 has been performed for all relevant registers in RF 400.

In some examples, a backup circuit may be provided to read all 32 registers via the Rt/Rd read port for backup, and to write back the backed-up non-corrupted value in the next cycle whenever an error is detected. During the write, the value that was read out is held latched in the Rt/Rd read port data retaining latches. Therefore, another read may not proceed in parallel during this time—the RF repair read/write cycles cannot be pipelined.

When a dual redundant mismatch is detected on the write-back data during a write, the backup copy of the data that was read out in the previous clock cycle is restored into RF 400. This value is held in a storage element or holding register 790 (FIG. 7) that is spatially separated from the path into the RF write port in order to ensure that data corruption in that path will not also result in the backup copy being corrupted as well. Although unlikely, it's possible that a dual redundant writeback data error is detected in the same cycle as a dual redundant read port error. When this happens, the backup copy of the data that was read out in the previous cycle is restored into the RF first, followed by the RF repair process. In the embodiment where only the dual redundant write port data is checked for mismatches, the latter situation will not occur.

A scrub circuit can also be used to periodically scrub the RF by reading out one register when the Rt/Rd read port is not in use during that cycle, e.g., during a store instruction. A counter is then incremented to point to the next register to scrub. This counter is shared with the RF repair state machine. If an error is detected during the scrub, the above repair process is initiated and the scrub state machine is reset to start at the first register again. The RF repair and scrub state machines are triple redundant in order to avoid a situation where an SEE causes one of them to enter an unrecoverable bad state.

Figure 9:
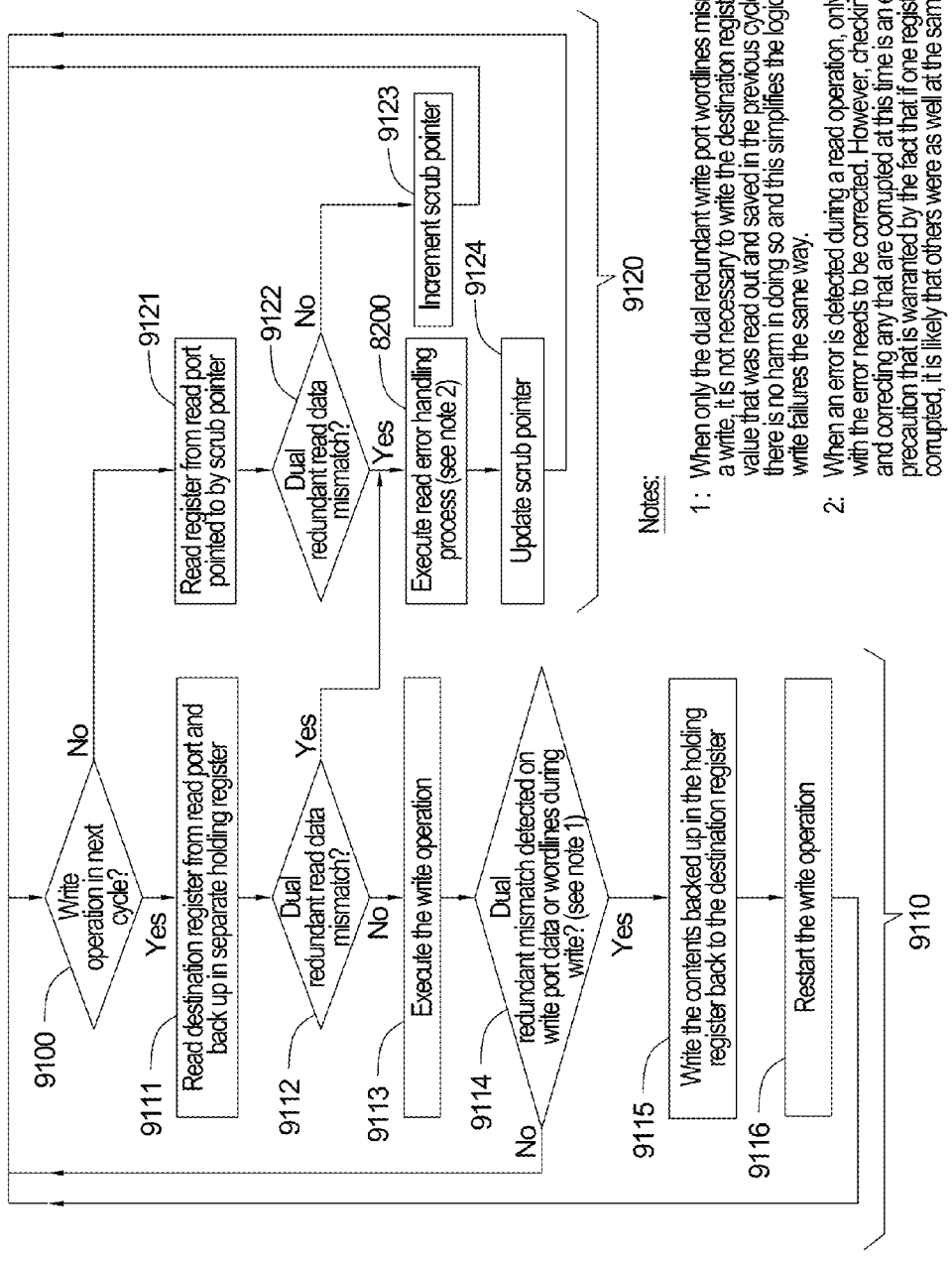
FIG. 9 shows a flowchart for a method for handling a scrubbing operation and dual redundant mismatches detected between write ports and write wordlines of a dual redundant register file

A flowchart for method 9000 illustrating the error detection and correction mechanism for errors detected during a write is shown in FIG. 9. This flowchart also shows the operation of the scrubbing mechanism.

Method 9000 comprises block 9100 for determining whether a next cycle in the operation of a memory device will be a write cycle. Such determination can be important in the present example for establishing whether method 9000 will perform write error handling operation 9110 or scrubbing operation 9120 in the current cycle.

If the next cycle comprises a write operation, method 9000 can execute write error handling operation 9110, starting with block 9111 by reading a destination register from a read port before and then backing up the data from the destination register into a holding register. The read port can be a third read port or a scanning port of the register. In the example of FIG. 7, the destination register can comprise a dual-redundant register that is read out from register files A (71400) and B (72400) via the Rt/Rd read ports thereof and backed up in the current cycle at holding register 790. Holding register 790 is spatially separated from the bitlines into register files A (71400) and B (72400) in order to restrict the likelihood of concurrent corruption with data being written into register files A (71400) and B (72400).

Write error handling operation 9110 continues with block 9112 for determining whether a dual redundant mismatch has occurred on read port data during a read operation for the destination register. In some examples, block 9112 can be similar to block 8100 of method 8000 (FIG. 8). If a dual redundant mismatch is detected, then write error handling operation continues with read error handling operation 8200 as described above for method 8000 (FIG. 8).

If no dual redundant mismatch is detected for the destination register in block 9112, write error handling operation 9110 continues with block 9113 for executing the write operation into the destination register. After block 9113, write error handling operation 9110 can continue with block 9114 for confirming that the write operation succeeded by detecting for dual redundant mismatch on write port data or write wordlines of the destination register. In some examples, block 9114 can be implemented via a circuit similar to that shown for dual redundant mismatch checking logic 450 at the top portion of FIG. 6(a) for the comparison of write port data and wordlines.

If the dual redundant mismatch on the write port data or write wordlines is detected in block 9115, write error handling operation 9110 can continue with block 9115 for writing the contents backed up in the holding register back to the destination register. This resets the destination register to the previous state before the write error occurred, before restarting another attempt for the write operation in block 9116 of write error handling operation 9110.

Returning to block 9100 of method 9000, if the next cycle does not comprise a write operation, scrubbing operation 9120 can be executed instead of write error handling operation 9110. In the present example, block 9121 of scrubbing operation 9120 comprises reading a target register from a read port pointed to by a scrub pointer, where the scrub pointer is configured to sequentially cycle to a subsequent target register of the register file after each iteration of scrubbing operation 9120. The read port can be a third read port or a scanning port of the register. Once the register is read in block 9121, block 9122 can be executed to determine whether a dual redundant read data mismatch has occurred. In one example, block 9122 can be similar to block 8100 of method 8000 (FIG. 8). If no dual redundant read data mismatch is detected in block 9122, the scrub pointer can be incremented in block 9123, and scrub operation 9120 can be terminated for the present iteration. However, if a dual redundant read data mismatch is detected in block 9122, such mismatch can be corrected by executing read error handling operation 8200 as described above for method 8000 (FIG. 8). Scrub operation 9120 can then be terminated for the present iteration by resetting, incrementing, or otherwise updating the scrub pointer for the next iteration of scrub operation 9120.

In some examples, some of the blocks of methods 8000 and/or 9000 can be subdivided into one or more different sub-blocks. In the same or other examples, one or more of the different blocks of methods 8000 and/or 9000 can be combined into a single block or performed simultaneously, and/or the sequence of such blocks can be changed. There can also be examples where methods 8000 and/or 9000 can comprise further or different blocks. Other variations can be implemented for methods 8000 and/or 9000 without departing from the scope of the present disclosure.

Parity Generation and Checking

As discussed above, there are 8 parity groups per register in one embodiment. Arbitrarily, even parity is used in all 8 parity groups in the RF. Other parity schemes may be used and still be effective. With even parity, the parity bit is set if the number of logic ones across the data bits belonging to the parity group is odd (making the total number of logic ones, including the parity bit, even). Parity is generated prior to the writeback stage as shown in FIG. 7. Parity checkers are only required on the Rt/Rd read port since this is the read port used during the repair process.

Additional Radiation Hardening Details

Now that the overall organization of the RF and its radiation hardening features have been presented, it would be worthwhile to review a checklist of RF related errors that may occur due to an SEE in order to verify that all cases are covered to a satisfactory level.

Metastability Issues

Figure 10:
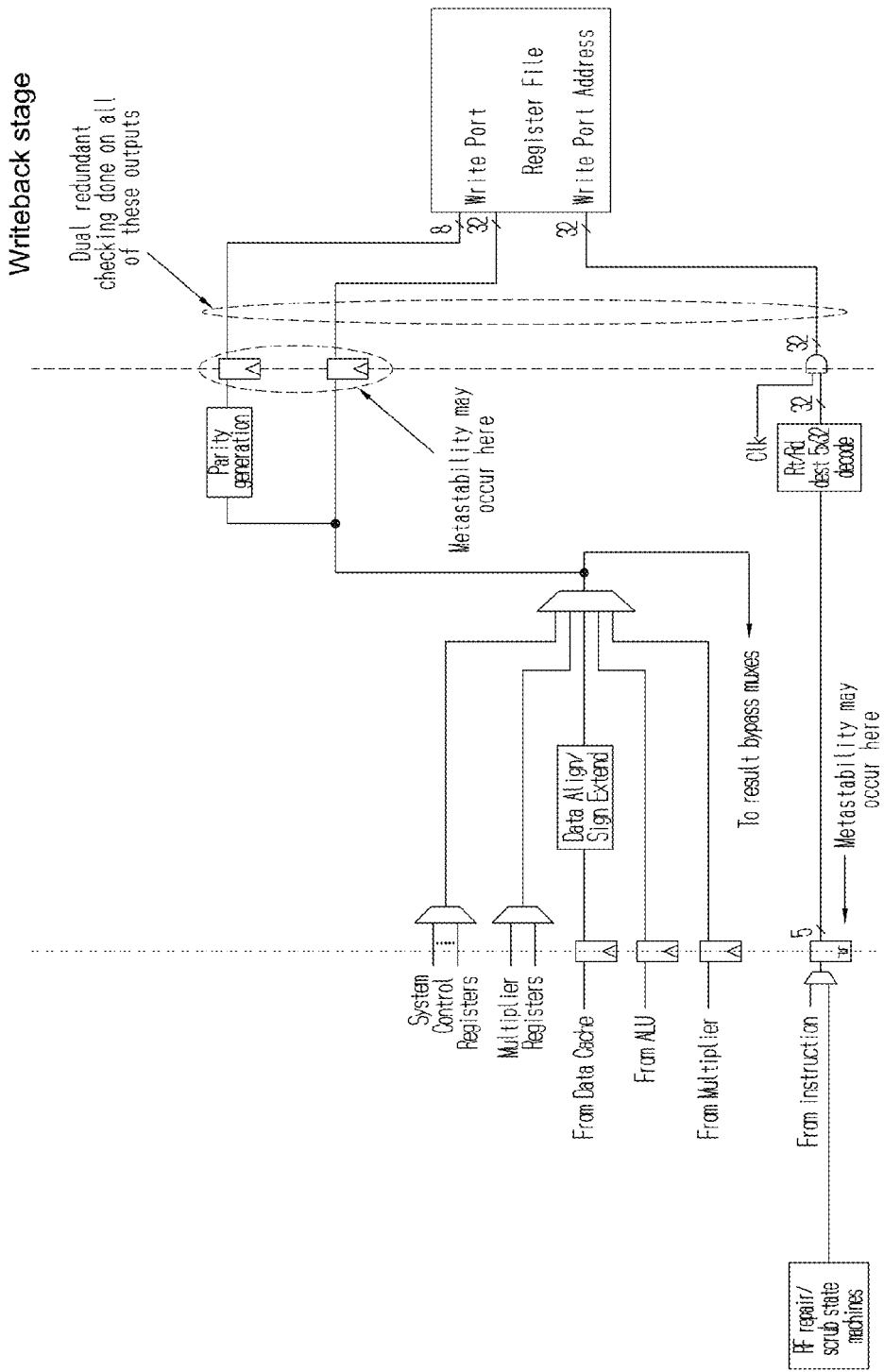
FIG. 10 shows an exemplary RF write path.

SEEs are asynchronous events that may result in clocked state elements becoming metastable. Special care must be taken in the RF write path to ensure that a metastable state in the state elements driving data into the RF does not result in an undetected error making its way into the architectural state. The write path of one embodiment into the RF is shown in FIG. 10.

During a write into the RF, it's possible that an SEE results in one of the state elements behind the write data or write port wordline paths becoming metastable. Dual redundant checking is performed on the write data and write port wordlines, and the result is sampled on the falling edge of the clock as shown in FIG. 6. Due to different path delays or circuit sensitivities in the separate paths leading to the dual redundant checking logic and the RF, two rules described are followed. Namely:

1. Dual redundancy checking is not performed directly at the output of the state elements in this case. Instead, the checking is performed after the output of these state elements has gone through some number of gates, thus providing signal gain helping to resolve any metastability quickly. The write port wordlines can be checked directly since the 5×32 decoder gates sit between the wordlines and the transparent low latches driving the decoder (i.e., the latches that may go metastable). For the data, buffering and multiplexing occurs after the flip-flops before reaching the final write port bitlines. These bitlines are then used to drive both the dual redundant checking logic as well as the RF write port cells to ensure that they see the same value.
2. The delay through the dual redundant checking logic will be made approximately the same as the delay through the RF write port for both wordlines and data. This requires a windowing circuit as evident in FIG. 6 above.

With respect to item 2 above, the delay through the dual redundant checking logic is designed to be approximately the same as the delay through the RF write port data for the following reasons:

1. If the output from a metastable state element (driving the RF write data) is initially seen correctly at the write port, and that output subsequently switches to the incorrect value late in the RF write window, we would want to sample this data in the error checking logic either at the same time or later than the RF storage cell to which it is being written, in order to guarantee that the error is detected whereby the incorrect data made it in time into the cell.
2. If the output from a metastable state element is initially seen incorrectly at the write port, and that output subsequently switches to the correct value late in the RF write window, we would want to sample this data in the error checking logic either at the same time or earlier than the RF RAM cell to which it is being written, in order to guarantee that the error is detected whereby the correct data did not make it in time into the cell.

Note that the requirements above are not as stringent for the write port wordlines due to the dual redundancy assertion requirement for writing to a cell. In other words, if one wordline is asserted and the other one is driven from a path that is metastable, case (1) above would still result in a correct write as long as the wordline assertion window was long enough. Since writes occur very quickly into an RF RAM cell, the wordline assertion window would have to be very small to corrupt the write. As a result, case (2) is more important to catch.

SEE Error Coverage

With an RF that is not radiation hardened, there are several possible ways that corrupted data may find its way into a register, good data may find its way to the wrong address, or corrupted data may be read from a register, due to an SEE. These are shown in Table 3 along with their corresponding error detection/correction scheme. In addition to the listed error types, SEEs may cause timing related errors. For example, an SET may cause the leading edge of a read port wordline to be pushed out in time such that the read data is delayed. The delay may be such that the path through the dual redundant checking logic is still short enough to see the correct data appear in time whereas the path through the ALU is too long. As a result, the dual redundant checking logic sees no error when in fact there is one. However, for all such timing errors that affect the RF read ports (including errors that affect the precharge phase), dual redundant checking at the writeback stage of the pipeline will still catch the error. In the embodiment where dual redundant checking is not done on the read ports, the latter will not occur.

TABLE 3

RF corruption cases and error detection/correction scheme

| Corruption Cases | Error Detection/Correction |
| --- | --- |
| A particle strike occurs directly to a RAM cell (or multiple RAM cells). | Parity protection and minimum RAM cell spacing requirements are used. Whenever a dual redundant mismatch is detected during a read (or in another embodiment, only during a write), the pipeline is flushed and a state machine reads all RF registers. Whenever a dual redundant mismatch is detected during these reads, the dual redundant parity group instance with the parity error is then overwritten by the other instance. The probability of a multi-bit error accumulating in the same unit of parity protected data is minimized by an opportunistic periodic scrub function performed by the H/W. |
| The writeback data during a write may be corrupted (bad data goes to desired location). | The writeback data is dual redundant. When a mismatch is detected during a write, the pipeline is flushed, the value from the destination register that was read out in the prior cycle is restored back into the RF, and the instruction associated with the corrupted write is restarted. |
| The address during a write is corrupted (good data goes to undesired location). | Dual redundant wordlines prevent writes to the wrong address, and dual redundant wordline checking is done to detect such mismatches. When this case is detected, the pipeline is flushed and the instruction associated with the corrupted address is restarted. |
| More than one wordline is asserted during a write (good data goes to both desired and undesired locations). | In this case, the correct wordline is asserted, but it will be accompanied by at least one other undesired wordline assertion. Dual redundant wordlines prevent writes to the wrong address. In this case, no restart of the machine is required. However, to keep the error handling logic simple, when any wordline mismatch is detected during a write, the pipeline is flushed and the instruction associated with the corrupted wordline is restarted. |
| The correct wordline assertion is suppressed during a write (good data does not go to desired location, leaving stale data there instead). This may be accompanied by some other wordline assertion as well. | Dual redundant wordline checking is done to detect such mismatches. When this case is detected, the pipeline is flushed and the instruction associated with the corrupted wordline is restarted. |
| Any of the transistors in the output read path gets hit with an SET during a read. | This type of error should only affect one bit per parity-protected unit of data, so dual redundant data checking and parity will catch it. In this case, the pipeline is flushed, the RF repair process is initiated, and the instruction associated with the corrupted read is restarted. |
| The address during a read is corrupted. | In one embodiment, dual redundant read port data checking is done to detect such mismatches. In another embodiment, dual redundant checking is only performed on the writeback data into the RF. In either case, the pipeline is flushed, the RF is corrected, and the instruction associated with the corrupted instruction is restarted. |
| More than one wordline is asserted during a read. This would result in some read bitlines being erroneously discharged leading to an incorrect read value. | In one embodiment, dual redundant read port data checking is done to detect such mismatches. In another embodiment, dual redundant checking is only performed on the writeback data into the RF. When this case is detected, the pipeline is flushed, the RF is corrected, and the instruction associated with the corrupted data is restarted. |
| The correct wordline assertion is suppressed during a read. This may be accompanied by some other wordline assertion as well. | Same as above. |

TABLE 3-continued

RF corruption cases and error detection/correction scheme

| Corruption Cases | Error Detection/Correction |
| --- | --- |
| A bitline precharge driver gets hit with an SET during a read, resulting in contention and potentially a bad value read out. | Same as above. |
| The driver that enables the bitline precharge transistors gets hit with an SET during a read, resulting in contention. This would lead to corrupted data being read. | Same as above. |
| A bitline precharge driver gets hit with an SET during a precharge cycle, suppressing the bitline precharge. | Same as above. |
| The driver that enables the bitline precharge transistors gets hit with an SET causing the precharge cycle to be suppressed. | Same as above. |
| One or more wordlines are asserted while the bitlines are being precharged. This could result in a less than optimal precharge (thus affecting a subsequent read). When the read occurs, more than one bit per parity group may be affected. | Same as above. |
| One of the clocks driving the SDLs is hit with an SET during a read. | The clocks driving the A- and B-pipe instances of the RF are dual redundant, so this type of error will only affect one instance of the RF. In one embodiment, dual redundant read port data checking is done to detect such mismatches. In another embodiment, dual redundant checking is only performed on the writeback data into the RF. When this case is detected, the pipeline is flushed, the RF is corrected, and the instruction associated with the corrupted data is restarted. |

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present disclosure. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosure includes any other applications in which embodiment of the above structures and fabrication methods are used. The scope of the embodiments of the present disclosure should be determined with reference to claims associated with these embodiments, along with the full scope of equivalents to which such claims are entitled.

The disclosure herein has been described with reference to specific embodiments, but various changes may be made without departing from the spirit or scope of the present disclosure. Various examples of such changes have been given in the foregoing description. Considering the different examples and embodiments described above, the disclosure herein can permit or provide for greater hardening of related circuitry against radiation-induced effects.

Accordingly, the disclosure of embodiments herein is intended to be illustrative of the scope of the application and is not intended to be limiting. It is intended that the scope of this application shall be limited only to the extent required by the appended claims. Therefore, the detailed description of the drawings, and the drawings themselves, disclose at least one preferred embodiment of the present invention, and may disclose other embodiments thereof.

All elements claimed in any particular claim are essential to the circuit and/or method claimed in that particular claim. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims. Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A memory device comprising:
a first wordline for transmitting a first wordline control signal when the first wordline is asserted;
a second wordline for transmitting a second wordline control signal when the second wordline is asserted;
a first memory element comprising a first memory cell, wherein the first memory cell comprises:
a first transistor having a first control terminal coupled to receive the first wordline control signal from the first wordline;
a second transistor having a second control terminal coupled to receive the second wordline control signal from the second wordline, wherein the first transistor and the second transistor are operable to both activate when both the first wordline and the second wordline are asserted;
a bit cell coupled to the first transistor and the second transistor such that the bit cell is accessible to write a bit into the bit cell when the first transistor and the second transistor are both activated and to hold the bit in the bit cell when one or more of the first transistor and the second transistor are deactivated; and
a second memory element;
wherein the first and second memory elements are redundant to each other.

2. The memory device of claim 1, wherein:
the first memory element comprises a first register file; and
the second memory element comprises a second register file.

3. The memory device of claim 1, wherein:
the first memory element comprises a first SRAM memory; and
the second memory element comprises a second SRAM memory.

4. The memory device of claim 1, wherein:
the first memory element comprises a first scanning port configured to enable handling of an error of at least one of the first or second memory elements; and
the second memory element comprises a second scanning port configured to enable handling of the error.

5. The memory device of claim 4, wherein:
the first memory element comprises:
   a first read port set comprising:
      two or more first read ports to read from the first memory element; and
      the first scanning port; and
the second memory element comprises:
   a second read port set comprising:
      two or more second read ports to read from the second memory element; and
      the second scanning port.

6. The memory device of claim 4, further comprising:
a first bit group comprising memory cells of the first memory element including the first memory cell;
a second bit group comprising memory cells of the second memory element; and
an error handling circuit coupled to the first and second scanning ports and comprising:
   an error identification circuit configured to scan the first and second scanning ports to detect a corrupt bit group; and
   a feedback circuit configured to overwrite the corrupt bit group with a noncorrupt bit group;
wherein:
   the memory cells of the second bit group are redundant with, and correspond to, the memory cells of the first bit group;
   the corrupt bit group comprises one of the first or second bit groups; and
   the noncorrupt bit group comprises another one of the first or second bit groups.

7. The memory device of claim 6, wherein:
the first bit group comprises a first parity group; and
the second bit group comprises a second parity group redundant with the first parity group.

8. The memory device of claim 6, further comprising:
a first bit set comprising memory cells of the first memory element including the first memory cell;
a second bit set comprising memory cells of the second memory element; and
a mismatch checking circuit coupled to the first and second scanning ports and to the error handling circuit;
wherein:
   the memory cells of the second bit set are redundant with, and correspond to, the memory cells of the first bit set;
   the mismatch checking circuit is configured to:
      scan the first and second scanning ports to detect a mismatch between the first and second bit sets; and
   the error handling circuit is triggered by a detection of the mismatch.

9. The memory device of claim 8, wherein:
the first bit set comprises at least one of:
   a first word, a first half-word, or a first byte; and
the second bit set comprises at least one of:
   a second word, a second half-word, or a second byte.

10. The memory device of claim 8, wherein:
the first bit group comprises a first parity group; and
the second bit group comprises a second parity group redundant with the first parity group;
the first bit set comprises
   a first portion of the first bit group; and
   a first portion of the second bit group; and
the second bit set comprises:
   a second portion of the first bit group; and
   a second portion of the second bit group.

11. The memory device of claim 6, wherein:
the error identification circuit comprises:
   a first parity checker coupled to the first scanning port to check the first bit group for a first parity mismatch; and
   a second parity checker coupled to the second scanning port to check the second bit group for a second parity mismatch; and
the error identification circuit is configured to:
   identify the first bit group as the corrupt bit group when the first parity mismatch is detected; and
   identify the second bit group as the corrupt bit group when the second parity mismatch is detected.

12. The memory device of claim 11, wherein:
the error identification circuit is configured to:
   identify the first and second bit groups as corrupt when the first and second parity mismatches are detected; and
   generate an unrecoverable error signal.

13. The memory device of claim 11, wherein:
the feedback circuit comprises:
   a first multiplexer comprising:
      an output terminal of the first multiplexer coupled to a write port for the first bit group;
      a first input terminal of the first multiplexer coupled to the first scanning port;
      a second input terminal of the first multiplexer coupled to the second scanning port; and
      a control terminal of the first multiplexer coupled to the error identification circuit; and
   a second multiplexer comprising:
      an output terminal of the second multiplexer coupled to a write port for the second bit group;
      a first input terminal of the second multiplexer coupled to the first scanning port;
      a second input terminal of the second multiplexer coupled to the second scanning port; and
      a control terminal of the second multiplexer coupled to the error identification circuit;

wherein:
when the second bit group is identified as the corrupt bit group:
the first input terminal of the second multiplexer is coupled to the output terminal of the second multiplexer to write the first bit group from the first scanning port to the second bit group; and
when the first bit group is identified as the corrupt bit group:
the second input terminal of the first multiplexer is coupled to the output terminal of the first multiplexer to write the second bit group from the second scanning port to the first bit group.

14. The memory device of claim 6, further comprising:
a first holding register coupled to the first scanning port;
wherein:
the first holding register is spatially separated from a writepath to the first memory element;
the first memory element comprises one or more first registers;
when a destination register of the one or more first registers is designated to be written during a write operation of a next writing cycle, the destination register is copied during a present cycle to the first holding register for backup; and
when the write operation fails, the destination register is restored from the holding register.

15. The memory device of claim 1, wherein:
the first and second wordlines are redundant to each other;
the first memory element comprises one or more first memory cells that include the first memory cell;
the first and second wordlines are configured to control access to the one or more first memory cells; and
the first memory cells are unwriteable when any one of the first or second wordlines is de-asserted.

16. The memory device of claim 15, wherein:
the second memory element comprises one or more second memory cells;
the first and second wordlines are further configured to control access to the one or more second memory cells; and
the second memory cells are unwriteable when any one of the first or second wordlines is de-asserted.

17. The memory device of claim 15, further comprising:
a first bitline coupled to the first memory cell of the one or more memory cells;
wherein:
the bit cell comprises cross-coupled memory transistors and a first bit port;
the first and second transistors are each one of first and second access transistors coupled in series between the first bit port and the first bitline.

18. The memory device of claim 15, further comprising:
first and second driver circuits coupled to the first memory element and spatially separated from each other;
wherein:
the first driver circuit is configured to control an assertion of the first wordline; and
the second driver circuit is configured to control an assertion of the second wordline to match the assertion of the first wordline.

19. The memory device of claim 1, further comprising:
a first bit set comprising first memory cells of the first memory element including the first memory cell;
a second bit set comprising corresponding memory cells of the second memory element, the first memory cells of the first bit set being redundant with the corresponding memory cells of the second bit set;
a bitline comparison set comprising:
a first read port set for the first memory element, the first read port set comprising at least one of:
a first scanning port for each memory cell of the first bit set;
a first read port for each memory cell of the first bit set; or
a second read port for each memory cell of the first bit set; and
a second read port set of the second memory element, the second read port set comprising at least one of:
a second scanning port for each memory cell of the second bit set;
a third read port for each memory cell of the second bit set; or
a fourth read port for each memory cell of the second bit set;
a wordline comparison set comprising:
the first wordline configured to control access to at least one of the first or second bit sets; and
the second wordline is redundant with the first wordline and configured to control access to the at least one of the first or second bit sets; and
a mismatch checking circuit coupled to at least one of:
the bitline comparison set to detect a data mismatch between the memory cells of the first bit set and the corresponding memory cells of the second bit set; or
the wordline comparison set to detect an assertion mismatch between the first and second wordlines.

20. The memory device of claim 19, wherein:
the mismatch checking circuit comprises at least one of:
the first and second read port sets correspondingly coupled as inputs to a first XOR gate circuit to compare the first and second bit sets on a bit per bit basis; or
the first and second wordlines coupled as inputs to a second XOR gate circuit.

21. The memory device of claim 19, wherein:
the first bit set comprises a first parity group; and
the second bit set comprises a second parity group redundant with the first parity group.

22. A method comprising:
providing a memory device, comprising:
providing a first register file comprising a first register portion of a first dual redundant register of one or one or more dual redundant registers, the first register portion comprising one or more first parity groups of memory cells;
providing a first read port of the first register file coupled to a first scanning bitline of the first register portion;
providing a first write port of the first register file coupled to the first register portion;
providing a second register file redundant with the first register file and comprising a second register portion of the first dual redundant register, the second register portion comprising one or more second parity groups of memory cells, the second register portion redundant with the first register portion;
providing a second read port of the second register file coupled to a second scanning bitline of the second register portion;
providing a second write port of the second register file coupled to the second register portion;
providing a mismatch checking circuit coupled to the first and second read ports; and providing an error handling circuit coupled to the first and second write ports to execute a read error handling operation for recovering corrupt bits of the first and second register files;

using the mismatch checking circuit to scan for a dual redundant mismatch between the first and second register portions; and using the error handling circuit to execute the read error handling operation when the dual redundant mismatch is detected;

wherein using the error handling circuit to execute the read error handling operation comprises:
 using the error handling circuit to identify at least one of:
  corrupt parity groups of the first and second parity groups; or
  noncorrupt parity groups of the first and second parity groups;
 overwriting the corrupt parity groups with corresponding noncorrupt parity groups; and
 repeating the read error handling operation for other dual redundant registers of the first and second register files.

23. A method comprising:
providing a memory device, comprising:
 providing a first register file comprising a first register portion of a first dual redundant register of one or one or more dual redundant registers; and
 providing a second register file redundant with the first register file and comprising a second register portion of the first dual redundant register, the second register portion redundant with the first register portion; and
providing a scrub circuit to implement a scrub pointer of a scrubbing operation for periodically scanning for corrupt registers of the one or more dual redundant registers;
wherein the scrubbing operation comprises:
 reading the first and second register portions of the first dual redundant register when the scrub pointer points to the first dual redundant register;
 determining whether the first dual redundant register is corrupt due to a dual redundant mismatch between the first and second register portions;
 executing an error handling operation to overwrite corrupt parity groups of the first dual redundant register with corresponding noncorrupt parity groups of the first dual redundant register; and
 updating the scrub pointer to point to another dual redundant register of the one or more dual redundant register.

24. The method of claim 23, wherein:
the scrubbing operation is executed during a current cycle unless a cycle immediately after the current cycle comprises a write operation to the first dual redundant register.

25. A method comprising:
providing a memory device, comprising:
 providing a first register file comprising a first register portion of a first dual redundant register of one or one or more dual redundant registers; and
 providing a second register file redundant with the first register file and comprising a second register portion of the first dual redundant register, the second register portion redundant with the first register portion;
 providing first and second wordlines redundant to each other, each of the first and second wordlines coupled to control write ports for each of the first and second register portions of the first dual redundant register; and
providing a backup circuit to execute a write error handling operation for the first dual redundant register, the backup circuit comprising a holding register coupled to the first dual redundant register;
wherein the write error handling operation comprises:
 copying the first dual redundant register to the holding register when an immediately sequential cycle, relative to a current cycle, comprises a write operation for the first dual redundant register;
 comparing the first and second register portions of the first dual redundant register to detect a first dual redundant mismatch between the first and second register portions;
 if the first dual redundant mismatch is detected, then executing a read error handling operation to overwrite corrupt parity groups of the first dual redundant register with corresponding noncorrupt parity groups of the first dual redundant register;
 executing the write operation for the first dual redundant register;
 comparing the first and second wordlines to detect a second dual redundant mismatch between the first and second wordlines; and
 if the second dual redundant mismatch is detected, then copying the holding register to the first dual redundant register before restarting the write operation for the first dual redundant register;
wherein the first holding register is spatially separated from a writepath to the first dual redundant register.

* * * * *